United States Patent [19]

Tomek

[11] Patent Number: 4,842,059
[45] Date of Patent: Jun. 27, 1989

[54] FLEX JOINT INCORPORATING ENCLOSED CONDUCTORS

[75] Inventor: Martin L. Tomek, Houston, Tex.

[73] Assignee: Halliburton Logging Services, Inc., Houston, Tex.

[21] Appl. No.: 245,234

[22] Filed: Sep. 16, 1988

[51] Int. Cl.$^4$ .................. E21B 17/046; F16L 27/04
[52] U.S. Cl. .................................... 166/65.1; 166/242; 174/86; 285/166; 285/264
[58] Field of Search ............... 166/65.1, 242; 285/119, 285/166, 264; 174/86

[56] References Cited

U.S. PATENT DOCUMENTS

| | | | |
|---|---|---|---|
| 1,665,810 | 4/1928 | Gillick | 285/166 X |
| 1,927,703 | 9/1933 | Glowacki | 285/166 X |
| 2,147,491 | 2/1939 | Le Bus | 285/264 |
| 2,890,067 | 6/1959 | Morin | 285/166 |
| 3,216,751 | 11/1965 | Der Mott | 285/264 |
| 4,425,965 | 1/1984 | Bayh, III et al. | 285/264 X |
| 4,753,291 | 6/1988 | Smith et al. | 166/65.1 |

Primary Examiner—Stephen J. Novosad
Attorney, Agent, or Firm—William J. Beard

[57] ABSTRACT

A flex joint for an elongate oil tool which permits flexure and bending while yet protecting electrical conductors is disclosed. The duplicated flex joint incorporates a hollow knuckle having a passage therethrough received in a mating and confining socket terminating in a passage. The knuckle and socket form a flex joint. The flex joint is pinned so that rotation in a conic angle is permitted while rotation of the two components relative to one another is forbidden. The passage is periodically closed by means of a transverse plug, an electrical feedthrough permitting electrical conductors to extend through said plug. The passage is further protected from the intrusion of fluids from the well borehole by means of a spring loaded piston compensating pressurized sealed oil system which operates in an annular space on the exterior of the passage.

8 Claims, 1 Drawing Sheet

U.S. Patent   Jun. 27, 1989   4,842,059
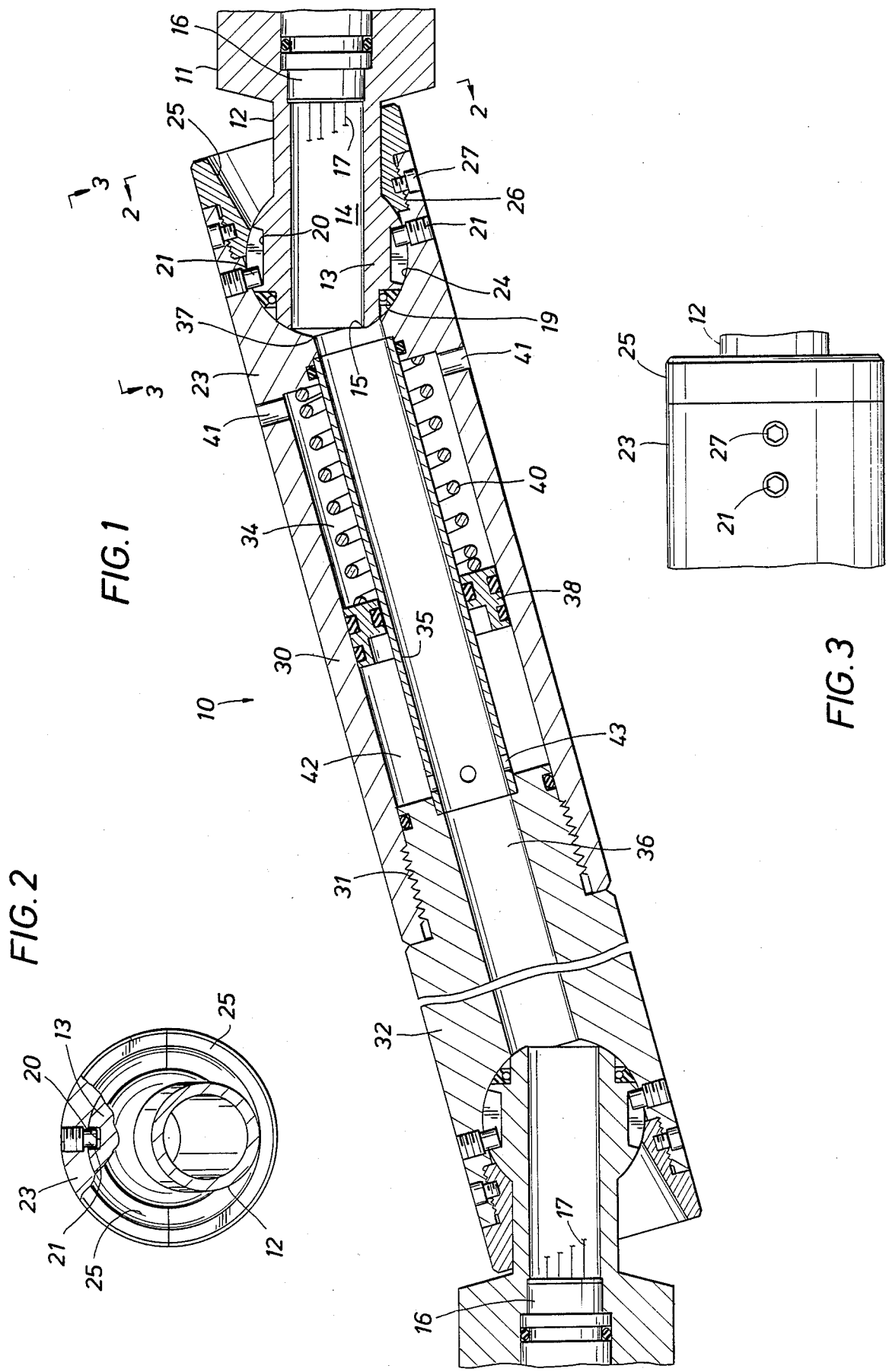

FLEX JOINT INCORPORATING ENCLOSED CONDUCTORS

BACKGROUND OF THE DISCLOSURE

The present apparatus is directed to a flex or knuckle joint which can be incorporated in an oil tool adapted to be lowered in a well borehole. Moreover, this is intended for incorporation in a long well tool which require midpoint flexure or bending. Indeed, it is not uncommon to require more than one flexure joint. Two or three joints may be necessary to enable a very long tool to travel along a serpentine passage as might typically be encountered in well completion services, conducting logging operations and the like.

The problem of bending a tool is not new; knuckle joints have been devised heretofore which enable long weight strings to be attached beneath a tool, the system typically including a sphere serving as an enlargement which is locked by a surrounding collar which has a certain measure of play. The present apparatus goes far beyond that in that it is intended for a knuckle or flexure joint which encloses multiple conductors along the center of the equipment. A sealed system is provided wherein the conductors are enclosed in an internal passage. The passage has sufficient size to receive multiple cables therein which are protected against the intrusion of well bore fluids. The interior is thus a sealed oil bath in which the conductors and the components of the system are pressure isolated from invasion of fluids common to the well. The pressure is maintained at the control level by incorporating a compensating piston which is exposed to prevailing pressures in the well borehole. The compensating piston bears against the oil bath to assure that the oil bath is properly pressurized, and moreover to ensure compensation for changes in oil volume due to compression of the fluid or other changes in volume. The compensating piston is spring loaded on the side of the well bore fluid to provide a positive pressure on the captured oil bath. The oil bath in conjunction with the constant pressure applied to it thus assuredly excludes well fluid from the interior working components of the system. This particularly protects the conductors and enables them to flex. Moreover, knotting, pinching or twisting of the conductors is prevented. The present apparatus features a knuckle comprised of a round sphere received in a surrounding socket. These components holding securely and yet permitting flexure. Rotation which would otherwise twist the conductors is prevented. Rotation is prevented by incorporating a fastening pin in the socket which extends into the sphere serving as a knuckle, and the sphere is cut with a lengthwise groove which limits flexure and prevents rotation, and thereby assures proper bending without rotation. This prevents twisting of the components.

The present apparatus is therefore summarized as an improved multiple knuckle and socket installation enabling flexure of an elongate oil tool. All the components are axially hollow with transverse bulkheads at spaced locations. The bulkheads receive feedthroughs for the conductors. Moreover, the feedthroughs provide pressure fluid isolation at the bulkhead. The bulkhead directs the cabling into closed chambers which are filled with protective oil. The oil is pressurized to the level attained by the ambient conditions downhole, and an increase above this level is insured by incorporating a pressure balanced piston biased by a spring to assure proper compensation. This excludes intrusion of fluids from the well borehole and thereby protects the internal working parts of the system.

BRIEF DESCRIPTION OF THE DRAWINGS

So that the manner in which the above recited features, advantages and objects of the present invention are attained and can be understood in detail, a more particular description of the invention, briefly summarized above, may be had by reference to the embodiments thereof which are illustrated in the appended drawings.

It is to be noted, however, that the appended drawings illustrate only typical embodiments of this invention and are therefore not to be considered limiting of its scope, for the invention may admit to other equally effective embodiments.

IN THE DRAWINGS

FIG. 1 is a sectional view through a flexible knuckle joint in accordance with the present disclosure showing an axial passage for receiving conductors therethrough and wherein all the working components are sealed with an oil bath maintained under pressure;

FIG. 2 is a sectional view along the line 2—2 of FIG. 1, showing details of the split socket housing for locking the socket in position; and FIG. 3 shows the pin which limits rotation of the knuckle and the adjacent set screw for holding the socket housing in position.

DETAILED DESCRIPTION OF THE PREFERRED EMBODIMENT

The numeral 10 identifies an elongate oil tool body constructed in accordance with the teachings of the present disclosure and particularly featuring multiple knuckle joints to enable the oil tool to travel through crooked or serpentine well boreholes. The present apparatus is particularly adapted for incorporation with elongate oil tool bodies which accomplish a multitude of tasks, the other components thereof being connected above or below the portion shown in FIG. 1. In this context, the oil tool 10 is normally incorporated with other downhole equipment such as pressure testing or measuring equipment. It also might be run into a well with a packer connected above or below the equipment shown in FIG. 1. It is intended to cooperate with equipment which requires electrical connections to be made along the length of the oil tool so that electrical conductors are placed on the inside of the oil tool 10 and extend from one end to the other to interconnect the various portions of equipment where signal communication is required from the various components. In other words, signal transfer above and below the oil tool is accomplished by the apparatus of this disclosure. Accordingly, both ends of the equipment shown in FIG. 1 connect to other portions of equipment which are a part of the elongate oil tool body and which in some fashion involve placement of electrical conductors in the oil tool 10.

The apparatus shown in FIG. 1 incorporates an upper sub 11 which is adapted to be connected with the connected equipment. It is made with an elongate narrow neck 12 and terminates at a spherical knuckle 13. It is hollow at 14 thereby providing an internal passage terminating at 15 which aligns with other passages to be described. The passage 14 is plugged with a threaded plug 16 and various feedthroughs for electrical conductors 17 are installed in the plug 16. The number, size and position of the feedthroughs can be varied; the conductors 17 are pressure isolated by the plug 16 and the feedthroughs. Preferably, the feedthroughs provide hermetic sealing so that pressure isolation is sustained.

The spherical body 13 serves as a knuckle which is gripped by the surrounding socket to be described. While rotation is permitted, sealing is also accomplished on the outer face of the knuckle 13. An encircling ring or groove is cut in the knuckle 13. The groove receives a lip seal 19 to assure that the interior of the tool 10 is pressure isolated. The knuckle is formed with a lengthwise groove 20 which is preferably duplicated at two evenly spaced locations. The groove 20 extends along the length of the knuckle parallel to the passage 14. The groove has sufficient depth to receive a guide pin 21. The guide pin 21 has a width and radial inward extent enabling the pin 21 to move along the length of the groove 20, but movement in the trasnsverse direction for the pin 21 is forbidden. Moreover, the total travel length of the pin is limited by an inscribed angle which relates to 30° rotation. The flex joint of the present invention permits 15° rotation to both sides of a centerline axis, or a total of 30° deflection. This is a scale factor which is acceptable in most applications, and is believed to be sufficient to enable the tool 10 to be used in practically any circumstance. The pin 21 is supported by a surrounding socket system as will be described.

The opposite end of the tool 10 includes a duplicate of the equipment just described. That is, the conductors 17 are again shown at the opposite end of the tool routed through a plug 16 by suitable feedthroughs. The flex joint 10 of third disclosure is intended for use with an oil tool system where flexure of the tool is required and yet electrical conductors must be routed along the length of the tool. In this particular instance, the conductors 17 are shown at both ends of an open passageway which permits communication. The conductors are positioned in the pasasgeway with some measure of slack. Assume in a typical instance that several conductors are included in the passageway and that some of the conductors deliver electrical power while others are signal conductors. The power transfer conductors typically are formed of larger gauge wire. By contrast, the signal conductors are typically smaller gauge wire. It might even be necessary to utilize a coaxial cable to transmit a very small signal free of external noise. In any event, if a coaxial cable is required, suitable feedthroughs are believed to be well known and they are incorporated so that this as well as all other cables extending along the oil tool 10 can be positioned in the internal passage.

It is important to avoid twisting the cables. The cables are provided with a measure of slack to that flexure of the flex joint 10 is permitted without pulling. Even so, it is damaging to the multiple conductors 17 to permit twisting. To this end, twisting is prevented in the manner to be described. Moreover, the conductors 17 are surrounded with an oil bath for protection. This excludes the intrusion of well fluid by means of a presurized system.

Returning again to the detailed description, the numeral 23 identifies a hollow sub which has an internal spherically conforming surface 24 which fits around the knuckle 13. The sub 23 is axially hollow and is drilled from the end to define the spherical surface 24. This enables the knuckle 13 to slip into and out of the end of the sub 23. The sub terminates at a threaded skirt which receives a split socket 25. The socket 25 has external threads at 26 to enable the socket to be threaded fully into the sub. The socket 25 locks the knuckle 13 in a locked position. When the socket shoulders up after threading, it defines an internal curving surface which conforms to the outer surface of the sphere 13 and which permits movement of the knuckle. Moreover, when these two components are locked together, the knuckle is able to flex but can not pull free. The socket is preferably formed of two pieces. Typically, it can be formed of three or four pieces which collectively form the complete encircling structure. They can be held together collectively by a garter spring so that they become a functioning unit thereby forming the assembled socket which is then threaded to the sub 23. Once the assembled segments of the socket are put together and are threaded partly to the threads 26, they hold together and thread collectively so that the final position is accomplished. Moreover, threading the components together in this fashion positions them in the desired position where they are preferably held against slippage by means of a set screw 27. This locks the segmented socket in position. Further, the pin 21 is inserted from the exterior as shown in FIG. 3 of the drawings so that it protrudes into the groove 20. The pin 21 is preferably duplicated on opposite sides so that the cooperative pins and grooves are duplicated.

The sub 23 connects with an elongate hollow sleeve 30 which extends substantially along the body 10. It terminates at a set of threads 31 and threads around a lower sleeve 32. The sleeve 32 terminates at a duplicate of the sphere and socket at the lower end. The lower portions of the sleeve 32 thus incorporate the structural components of the sub 23 just described. This serves as the duplicate of equipment at the lower end of the apparatus.

The sleeve 30 defines an internal annular space 34 which is on the exterior of a narrow diameter thin wall sleeve 35. The sleeve 35 is axially threaded into the drilled opening formed in the sub 23 and it extends to the sleeve 32 and connects to form a socket connection therewith. The sleeve 35 in conjunction with the lower sleeve 32 forms an axial passage 36 along the length of the body. The passage 36 terminates at an upper end 37, the opening serving as an inlet in communication with the opening 15 on the knuckle. Thus, an axial passage through the flex joint is defined.

The sleeve 35 defining the surrounding annular space 34 serves as a support for a circular piston ring 38. The right side of sleeve 35 is sealed to body 23 by an O-ring. This prevents mud from entering the oil. The ring 38 is equipped with external seals in contact with the surrounding concentric tubular members. A coil spring 40 forces the piston 38 in one direction. The sub 23 has pressure relief ports 41 formed therein which admit borehole fluid into the annular space 34. The spring and the prevailing fluid pressure force the circular piston ring 38 to the left. A chamber 42 is filled with protective electrical insulating oil. The chamber 42 communicates with the passage 36 by means of openings 43. This permits the entire internal working area to be filled with protective fluid. The conductors 17 are thus submerged in this fluid which may be described generally as an oil bath. The oil bath encloses the conductors from knuckle to knuckle. The conductors 17 thus extend on feedthroughs into the oil bath. This permits the conductors to operate without intrusion of fluids from the borehole.

The oil bath is isolated by a seal around the sleeve 35 connection to the sub 23. Oil is initially added to the interior through a fill port in the sub 23.

The fluid system just described is pressurized fluid system. Ambient pressure on the exterior of the tool 10 may vary widely depending on the depth of the well, the height of the drilling fluid column in the well and other factors. This creates an external pressure which acts on the oil tool. The chamber 34 is filled with fluid at this pressure. Moreover, the coil spring 40 bears against the circular piston 38. This adds to the pressure prevailing in the oil bath. The chamber 42 is thus a chamber receiving the compressed fluid which sustains the necessary oil bath. This pressurizes the entire region from knuckle to knuckle including the pressure sealing plugs 16 at both ends of the equipment.

Consider as an example operation of a tool at a depth where the prevailing external pressure is 3,000 psi. Dependent on the strength of the spring 40, the hydraulic fluid pressure within the chamber 42 might be 4,000 psi. the piston 38 is able to move to provide a continual pressure on the hydraulic system so that the oil is kept under pressure. This assures that the external fluid never invades the area where the working components are located.

Consider one example of the use of the present apparatus. Assume that it is on a wireline which carries one or more electrical conductors to the well head. Assume further that the wireline connects through the appropriate fishing neck and into the knuckle shown at one end of FIG. 1. Assume further that pressure and temperature recording apparatus are supported below the opposite knuckle of the flex joint 10. In that instance, the electrical conductors will extend fully through the equipment to deliver downhole pressure and temperature readings to the surface. This can be accomplished even in the most crooked of wells because the present invention permits flexure or bending of the tools which are lowered into the well. There is no risk of breaking the electrical conductors because the knuckles permit flexure in a 15° conic angle about the central axis. Furthermore, the internal pressure on the oil bath keeps out intrusive well fluids so that the equipment is protected even when it is left in the well borehole for a long interval. In FIG. 1 of the drawings, the preferred embodiment utilizes two pins 21 which are arranged 180° from one another and which are positioned diametrically opposite one another relative to the sphere 13. They therefore define an axis of rotation. As shown in the plane of FIG. 1, rotation is permitted because the pins are received within the mating grooves 20. That is, the two pins permit rotation around the center of the sphere with an axis of rotation perpendicular to the plane of FIG. 1. The sphere also is able to rotate where the two pins 21 define the axis of rotation. Thus, the axis of rotation is coincident with the plane of FIG. 1 where the upper sub is able to deflect by an equal measure, namely, about 15° in both directions. The total range of flexure of the knuckle is about 15° deviation from the centerline axis of the sub 23 and the connected sleeve 35. This provides a maximum angle across the cone of deflection of about 30°. The groove 20, however, confines the pin 21 so that relative rotation between the sphere 13 and the surrounding sleeve is not permitted. To this end, the groove 20 is preferably shaped so that the maximum deflection of 15° in the conic angle from the centerline axis of the equipment carries the pin against the sidewall of the groove 20. This serves as a limit against rotation.

While the foregoing is directed to the preferred embodiment, the scope thereof is determined by the claims which follow.

What is claimed is:

1. A downhole elongate oil tool adapted to flex as required in placing the elongate tool in a crooked well borehole wherein electrical signals are transmitted along conductors along the elongate tool, the elongate tool incorporating a flex tool comprising:
   (a) a generally spherical knuckle;
   (b) a surrounding socket engaging said knuckle with a limited rotational range relative to a defined axis through said knuckle and socket;
   (c) a passage through said knuckle opening at an outlet into said socket;
   (d) a serially communicated passage through said socket aligned with said knuckle;
   (e) means cooperative with said knuckle and said socket;
   (1) permitting flexure in a conic angle relative to an axis through said knuckle and socket; and
   (2) preventing relative axial rotation betwen said knuckle and said socket; and
   (f) means for filling said passages with a pressure isolated oil bath for contacting structural components in said passages, and further wherein said oil bath is pressure isolated by a piston responsive to external fluid pressure in the well borehole to sustain a pressure on said oil bath equal to and in excess of prevailing external pressure.

2. The flex tool of claim 1 wherein said knuckle passage and said socket passage align to receive electrical conductors therethrough.

3. The apparatus of claim 1 wherein the elongate oil tool includes first and second spaced knuckles cooperatively engaged with first and second sockets as described in claim 1 and said first and second knuckles are at opposite ends of an elongate hollow tubular body and said body has a lengthwise passage therethrough wherein said lengthwise passage receives electrical conductors therethrough and said conductors also pass through said knuckles.

4. The apparatus of claim 3 wherein each of said knuckles has a knuckle passage therethrough and said knuckle passage is closed by a plug to provide pressure fluid isolation at said passage, and said plug supports electrical feedthroughs for the electrical conductors.

5. The apparatus of claim 4 including means for filling said passages with a pressure isolated oil bath for contacting structural components in said passages, and further wherein said oil bath is pressure isolated by a piston responsive to external fluid pressure in the well borehole to sustain a pressure on said oil bath equal to and in excess of prevailing external pressure.

6. The apparatus of claim 5 wherein said elongate hollow tubular body encloses an internal sleeve, said sleeve and said body forming an annular space therebetween and said piston is a ring slidably received therein to define spaced and isolated first and second chambers, said first chamber being connected by a passage means to receive well borehole fluid.

7. The apparatus of claim 6 including a coil spring bearing against said piston to bias movement of said piston.

8. The apparatus of claim 3 including means for filling said passages with a pressure isolated oil bath for structural components in said passages, and further wherein said oil bath is pressure isolated by a piston responsive to external fluid pressure in the well borehole to sustain a pressure on said oil bath equal to and in excess of prevailing external pressure.

* * * * *